US011255462B2

(12) United States Patent
Bushman

(10) Patent No.: US 11,255,462 B2
(45) Date of Patent: Feb. 22, 2022

(54) VALVE POSITION INDICATOR

(71) Applicant: CACTUS WELLHEAD, LLC, Houston, TX (US)

(72) Inventor: Jerod C. Bushman, Tomball, TX (US)

(73) Assignee: CACTUS WELLHEAD, LLC, Houston, TX (US)

( * ) Notice: Subject to any disclaimer, the term of this patent is extended or adjusted under 35 U.S.C. 154(b) by 0 days.

(21) Appl. No.: 16/945,353

(22) Filed: Jul. 31, 2020

(65) Prior Publication Data
US 2020/0362986 A1 Nov. 19, 2020

Related U.S. Application Data

(63) Continuation-in-part of application No. 16/663,685, filed on Oct. 25, 2019, now Pat. No. 11,073,227.

(60) Provisional application No. 62/805,745, filed on Feb. 14, 2019.

(51) Int. Cl.
*F16K 37/00* (2006.01)
*F16K 3/02* (2006.01)
*F16K 31/528* (2006.01)

(52) U.S. Cl.
CPC ............ *F16K 37/0008* (2013.01); *F16K 3/02* (2013.01); *F16K 3/0254* (2013.01); *F16K 31/528* (2013.01); *F16K 31/5286* (2013.01); *F16K 37/0016* (2013.01); *Y10T 137/8275* (2015.04); *Y10T 137/8292* (2015.04); *Y10T 137/8309* (2015.04)

(58) Field of Classification Search
CPC ......... Y10T 137/8275; Y10T 137/8292; Y10T 137/8309; F16K 3/02; F16K 37/0008; F16K 37/0016; F16K 31/528; F16K 31/5286
See application file for complete search history.

(56) References Cited

U.S. PATENT DOCUMENTS

| 1,103,917 | A | ‡ | 7/1914 | Lawson | F16K 37/0008 116/277 |
|---|---|---|---|---|---|
| 6,007,047 | A | * | 12/1999 | Phipps | F16K 31/528 251/129.01 |
| 2010/0276016 | A1 | ‡ | 11/2010 | Noh | F16K 37/0041 137/554 |
| 2013/0105718 | A1 | ‡ | 5/2013 | Fache | F16K 1/221 251/305 |
| 2013/0146793 | A1 | * | 6/2013 | Gustafson | E21B 33/064 251/1.3 |
| 2014/0217320 | A1 | * | 8/2014 | DeOcampo | F16K 3/0254 251/326 |

(Continued)

*Primary Examiner* — Atif H Chaudry
(74) *Attorney, Agent, or Firm* — Ewing & Jones, PLLC

(57) ABSTRACT

A valve position indicator for a valve includes an outer housing, actuation rod, indicator flag, and follower. The actuation rod is positioned within the outer housing, which is couplable to a tail stem protector of the valve. The actuation rod may have a helical slot formed therein. The actuation rod may be rotatably coupled to the outer housing. The indicator flag may be coupled to the actuator rod and may extend radially therefrom. The follower may be couplable to a tail stem of the valve. The follower may extend in a direction perpendicular to the extent of the tail stem. The follower may extend through a slot in the tail stem protector and into the helical slot of the actuation rod when the valve position indicator is coupled to the tail stem protector.

16 Claims, 14 Drawing Sheets

(56) References Cited

U.S. PATENT DOCUMENTS

2019/0383313 A1‡ 12/2019 Fowler .................. F16K 31/122
2020/0378526 A1* 12/2020 Nelson .................. G05D 7/0629

\* cited by examiner
‡ imported from a related application

VALVE POSITION INDICATOR

CROSS-REFERENCE TO RELATED APPLICATIONS

This application is a continuation-in-part of U. S. nonprovisional application Ser. No. 16/663,685, filed Oct. 25, 2019, which claims priority from U.S. provisional application No. 62/805,745, filed Feb. 14, 2019, each of which is hereby incorporated by reference in its entirety.

TECHNICAL FIELD/FIELD OF THE DISCLOSURE

The present disclosure relates generally to valve equipment and specifically to visual indicators for valve positions.

BACKGROUND OF THE DISCLOSURE

Valves may be used to control the flow of fluids. Valves may be manually or automatically actuated such as by hydraulic or pneumatic actuators. However, the position of the valve, i.e. whether the valve is open or closed, may not be immediately recognizable by visual inspection due to the configuration of certain valves or distance separating personnel and the valve.

SUMMARY

The present disclosure provides for a valve. The valve may include a valve housing having a central bore. The valve may include a gate positioned within the valve housing, the gate movable from an open position and a closed position. The valve may include a tail stem coupled to the gate and extending from the valve housing. The tail stem may be movable from a retracted position to an extended position. The valve may include a tail stem protector coupled to and extending from the valve housing. The tail stem protector may be generally tubular and may be positioned about the tail stem. The tail stem protector may have a slot formed therein that extends longitudinally along the tail stem protector. The valve may include a valve position indicator. The valve position indicator may include a spline barrel. The spline barrel may be generally tubular and may be positioned about the tail stem protector. The spline barrel may have a helical slot formed therein. The spline barrel may be rotatably coupled to the tail stem protector. The valve position indicator may include an indicator flag coupled to the spline barrel and extending radially therefrom. The valve position indicator may include a follower coupled to the tail stem and extending in a direction perpendicular to the extent of the tail stem. The follower may extend through the slot in the tail stem protector and the helical slot of the spline barrel The present disclosure also provides for a valve position indicator for a valve. The valve position indicator may include a spline barrel. The spline barrel may be generally tubular and may be positionable about a tail stem protector of the valve. The spline barrel may have a helical slot formed therein. The spline barrel may be rotatably coupled to the tail stem protector. The valve position indicator may include an indicator flag coupled to the spline barrel and may extend radially therefrom. The valve position indicator may include a follower couplable to a tail stem of the valve. The follower may extend in a direction perpendicular to the extent of the tail stem. The follower may extend through a slot in the tail stem protector and the helical slot of the spline barrel when the spline barrel is positioned about the tail stem protector.

The present disclosure also provides for a method. The method may include providing a valve. The valve may include a valve housing having a central bore. The valve may include a gate positioned within the valve housing, the gate movable from an open position and a closed position. The valve may include a tail stem coupled to the gate and extending from the valve housing. The tail stem may be movable from a retracted position to an extended position. The valve may include a tail stem protector coupled to and extending from the valve housing. The tail stem protector may be generally tubular and may be positioned about the tail stem. The tail stem protector may have a slot formed therein that extends longitudinally along the tail stem protector. The method may include coupling a valve position indicator to the valve. The valve position indicator may include a spline barrel, the spline barrel being generally tubular and positioned about the tail stem protector. The spline barrel may have a helical slot formed therein. The spline barrel may be rotatably coupled to the tail stem protector. The valve position indicator may include an indicator flag coupled to the spline barrel and extending radially therefrom. The valve position indicator may include a follower coupled to the tail stem. The follower may extend in a direction perpendicular to the extent of the tail stem. The follower may extend through the slot in the tail stem protector and the helical slot of the spline barrel. The method may include moving the tail stem from the retracted to the extended position and rotating, with the follower, the spline barrel between a first position and a second position. The method may include moving the indicator flag from a first position to a second position.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
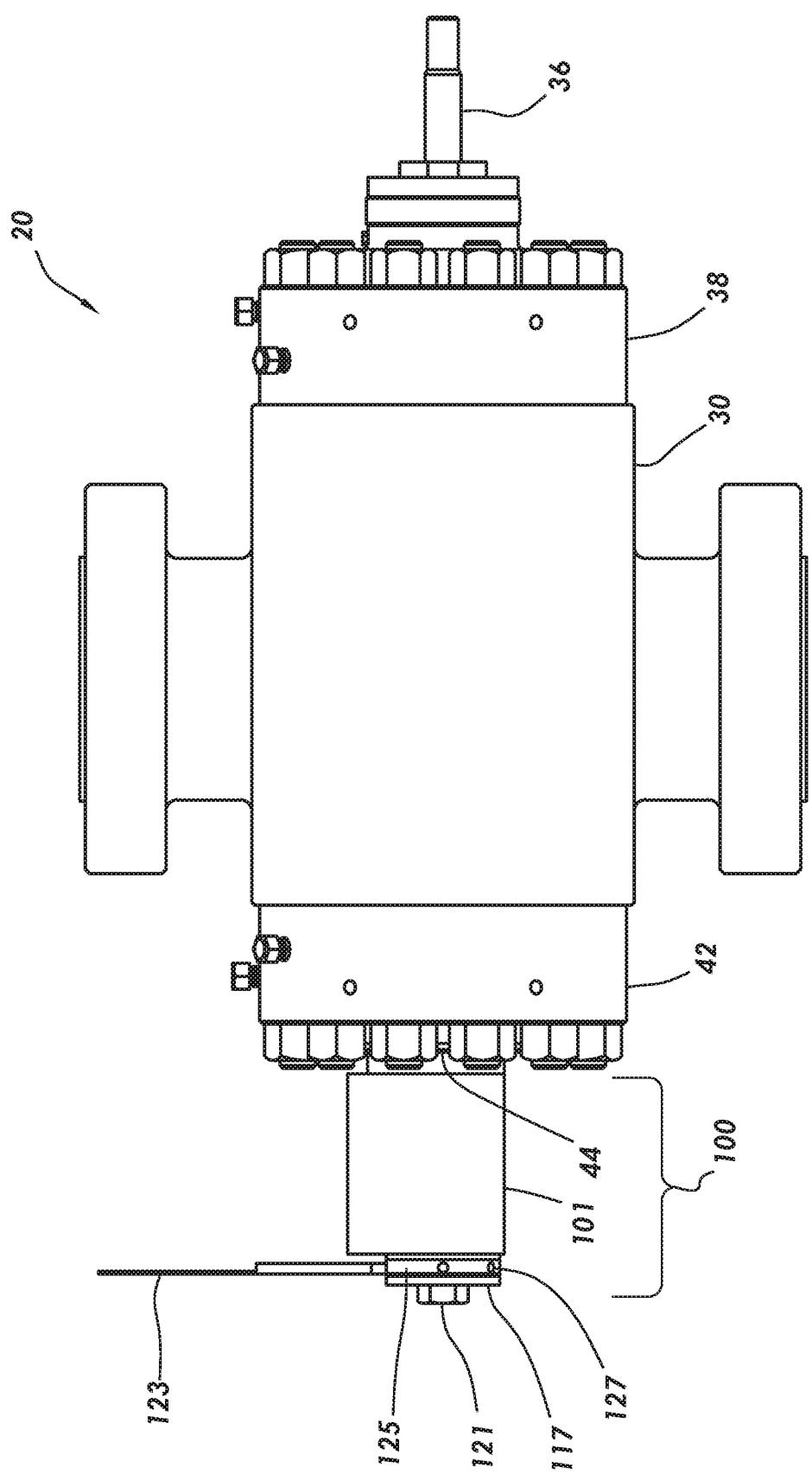
FIG. 1 depicts a valve having a valve position indicator consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts valve 20 consistent with at least one embodiment of the present disclosure. In some embodiments, valve 20 may be a gate valve. In some embodiments, valve position indicator 100 may, for example and without limitation, visually indicate the status of the valve 20 to which valve position indicator 100 is coupled, i.e. whether valve 20 is in an open position or a closed position; may visually indicate that valve 20 is in an intermediate position between fully open and fully closed; or may visually indicate that valve 20 is moving between the open and the closed positions, as further described below.

Figure 2:
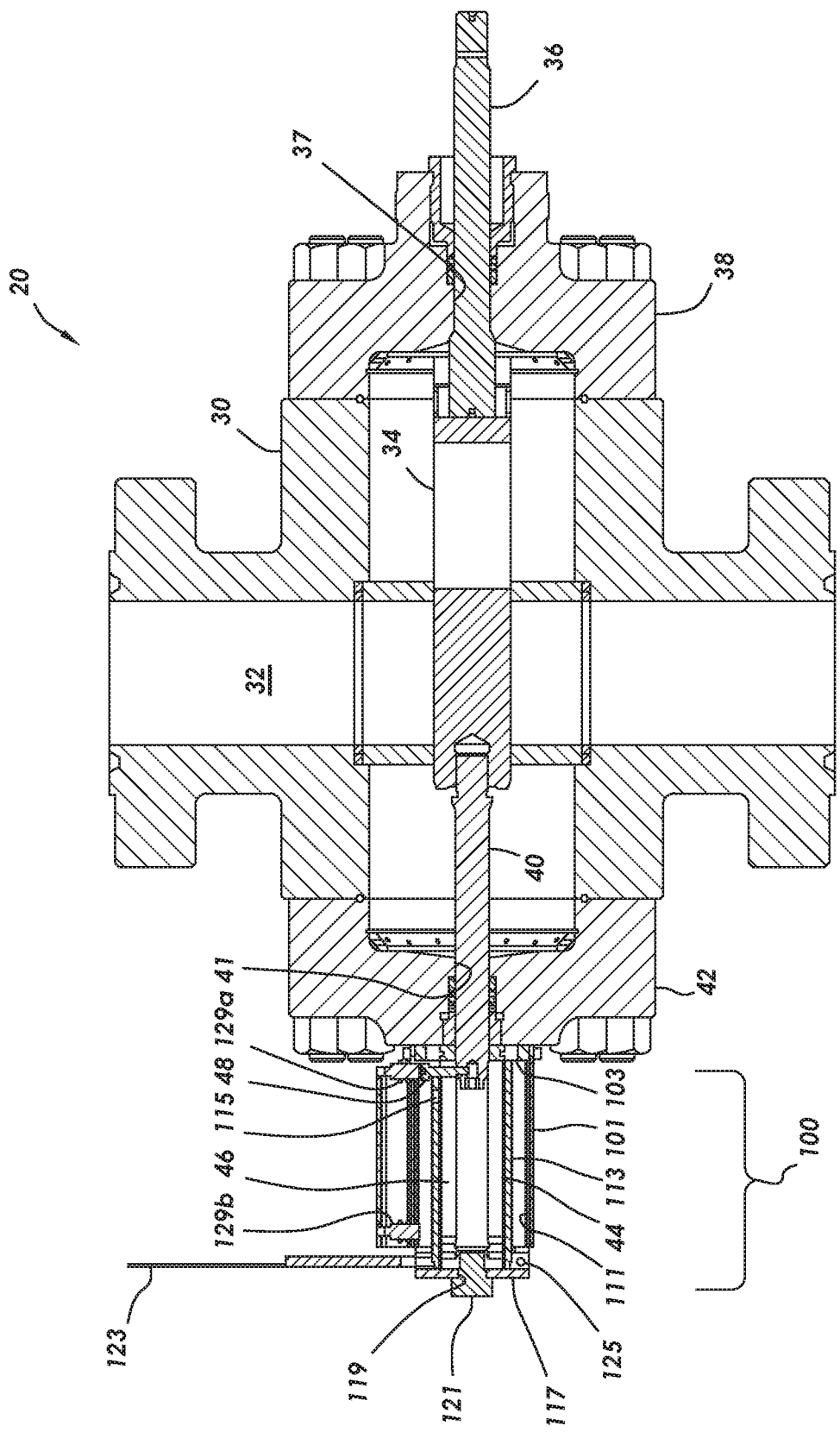
FIG. 2 depicts a cross-section view of the valve of FIG. 1.
Figure 3:
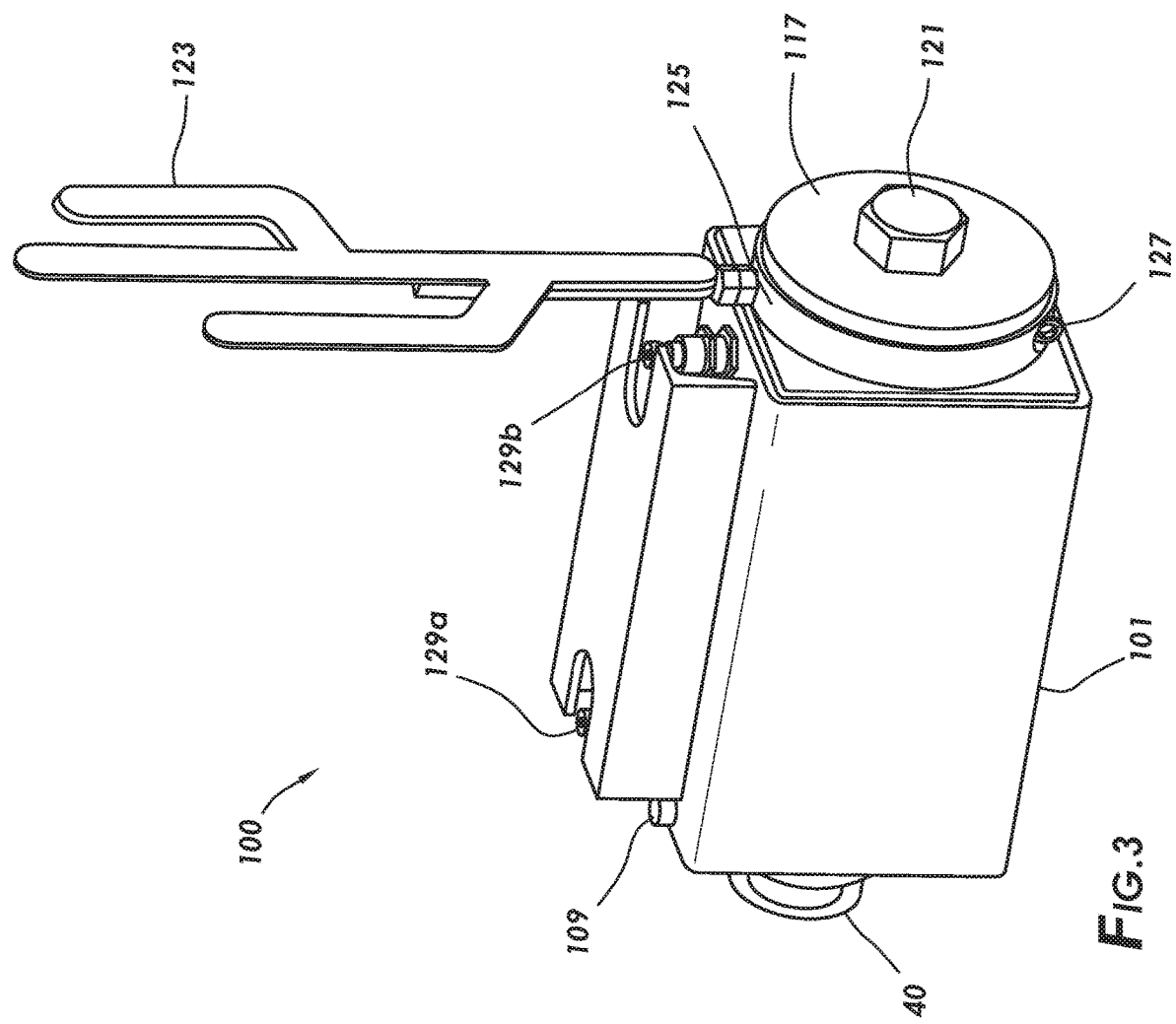
FIG. 3 depicts a perspective view of a valve position indicator consistent with at least one embodiment of the present disclosure.
Figure 4:
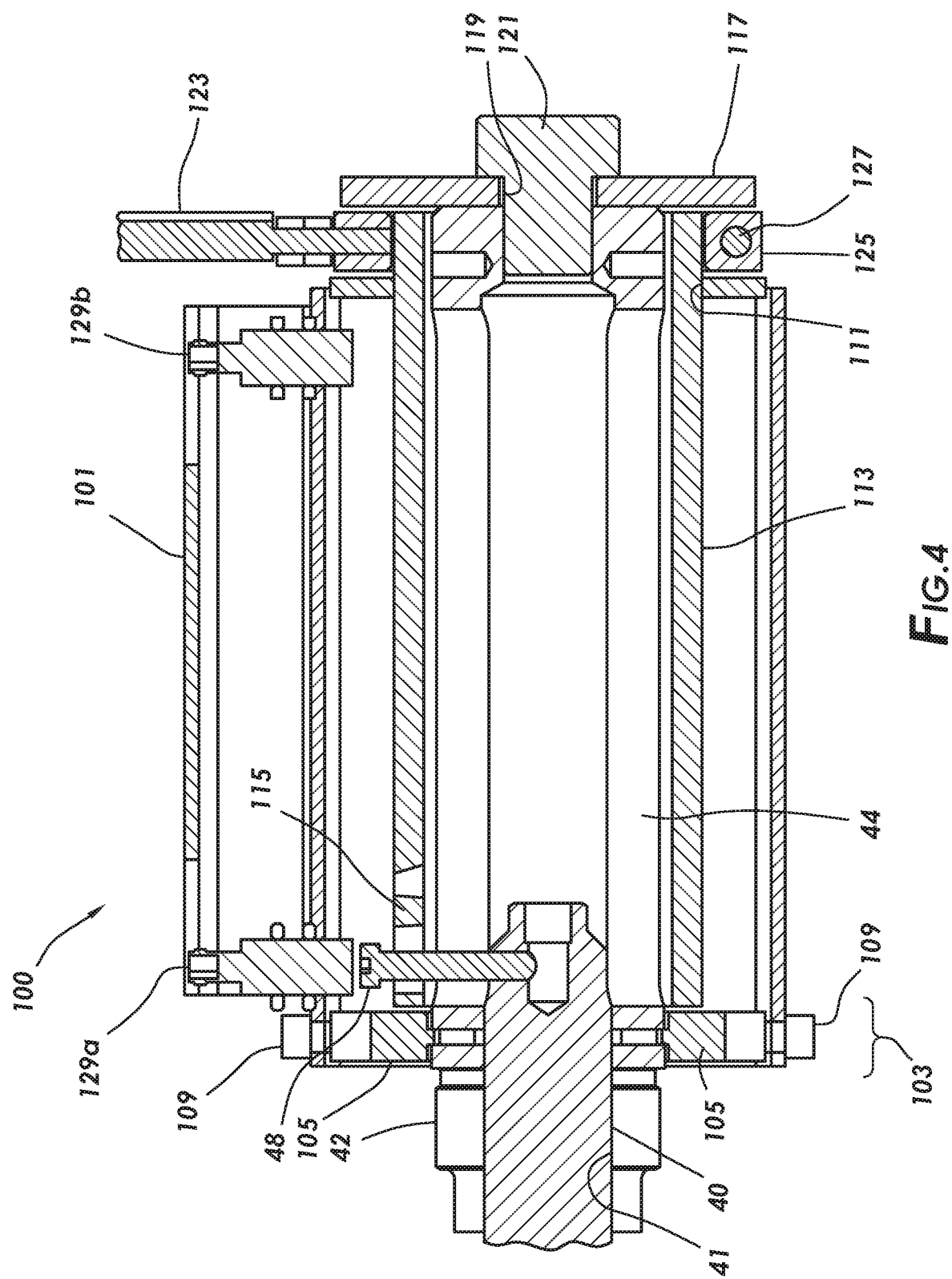
FIG. 4 depicts a cross-section of the valve position indicator of FIG. 3.
Figure 5:
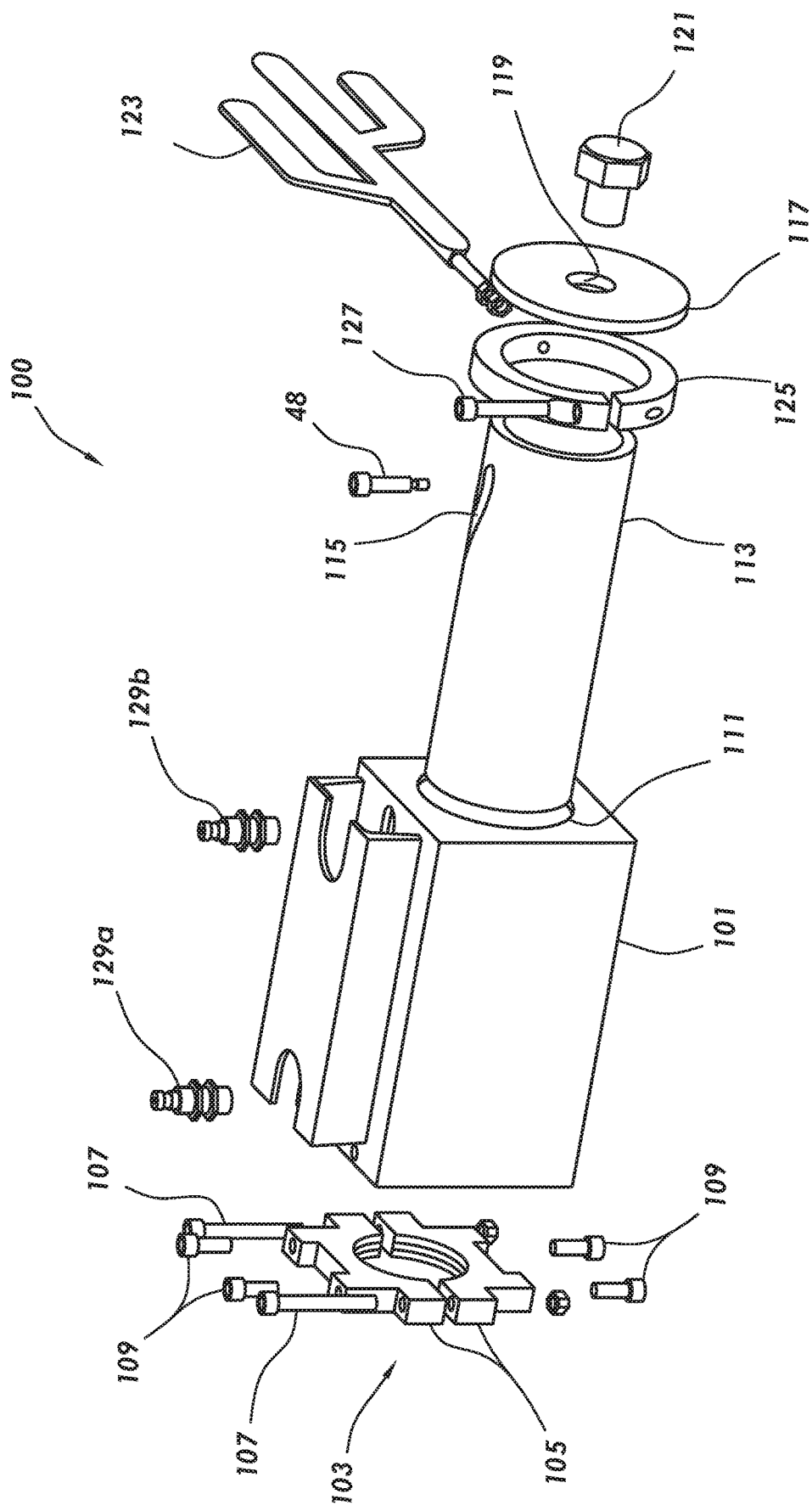
FIG. 5 depicts a partially transparent exploded view of the valve position indicator of FIG. 3.

FIG. 2 depicts a cross-section of valve 20 having valve position indicator 100 coupled thereto. Valve 20 may include valve housing 30. Valve housing 30 may include central bore 32 that can be selectively opened or closed by valve 20. In some embodiments, valve 20 may be a gate valve, but one of ordinary skill in the art with the benefit of this disclosure will understand that other types of valve may be used with valve position indicator 100 without deviating from the scope of this disclosure. In some such embodiments, valve 20 may include gate 34 positioned within valve housing 30, which is adapted to move between a position in which central bore 32 is open to fluid communication through central bore 32 and a closed position, as depicted in FIG. 2, in which central bore 32 is closed to fluid communication therethrough. In some embodiments, gate 34 may be moved between the open position and the closed position by stem 36. Stem 36 may extend through hole 37 formed in bonnet 38, which is mechanically coupled to and sealed to valve housing 30 such that stem 36 may move along the longitudinal axis of stem 36 through hole 37. In some embodiments, stem 36 may be at least partially threaded or may be otherwise coupled to a threaded rod such that stem 36 may be moved by turning a crank or handwheel. In some embodiments, stem 36 may be moved using an actuator such as a hydraulic or pneumatic actuator.

In some embodiments, gate 34 may be supported on the end opposite stem 36 by tail stem 40. Tail stem 40 may extend through hole 41 formed in tail bonnet 42, which is mechanically coupled to and sealed to valve housing 30 such that tail stem 40 may move along the longitudinal axis of stem 36 and tail stem 40 through hole 41 as stem 36 is moved to reposition gate 34. In some embodiments, when gate 34 is in the open position, tail stem 40 may extend from tail bonnet 42 a larger distance, defining an extended position of tail stem 40, than when gate 34 is in the closed position, defining a retracted position of tail stem 40.

In some embodiments, tail stem 40 may be positioned within tail stem protector 44 to, for example and without limitation, avoid damage to tail stem 40 when tail stem 40 is extended from tail bonnet 42. Tail stem 40 may be generally tubular and may be mechanically coupled to tail bonnet 42 about hole 41. In some embodiments, tail stem protector 44 may include slot 46 extending longitudinally along tail stem protector 44. In some embodiments, follower 48 may be coupled to tail stem 40. Follower 48 may be a protrusion or other body coupled to tail stem 40 such that follower 48 extends in a direction perpendicular to the extent of tail stem 40. Follower 48 may extend at least partially through slot 46 of tail stem protector 44. In some embodiments, follower 48 may be a threaded fastener such as a bolt or shoulder bolt or may be a pin or any other fastener or body coupled to tail stem 40 that extends perpendicular to the extent of tail stem 40.

In some embodiments, valve position indicator 100 may mechanically couple to tail stem protector 44 of valve 20. Valve position indicator 100, as shown in FIGS. 2-5, may include outer housing 101. Outer housing 101 may be an elongated tube or box-shaped body that, when installed to tail stem protector 44, may extend along the outside of tail stem protector 44. Outer housing 101 may mechanically couple to tail stem protector 44 using clamp 103. Clamp 103 may include one or more clamp jaws 105, which may be connected together about tail stem protector 44 using one or more threaded fasteners, such as bolts 107. Clamp 103 may subsequently be coupled to outer housing 101 using one or more threaded fasteners such as bolts 109.

In some embodiments, outer housing 101 may include opening 111 at the end of outer housing 101 opposite clamp 103. In some embodiments, opening 111 may be positioned generally aligned with the end of tail stem protector 44.

In some embodiments, valve position indicator 100 may include spline barrel 113. Spline barrel 113 may be generally tubular and may be positioned within outer housing 101 outside of tail stem protector 44. Spline barrel 113 may include helical slot 115. Helical slot 115 may extend from near the first end of spline barrel 113 to near the second end of spline barrel 113. Helical slot 115 may be formed to have a pitch such that the first end of helical slot 115 is offset by a selected angle from the second end of helical slot 115. In some such embodiments, for example and without limitation, the first end of helical slot 115 may be rotationally offset from the second end of helical slot 115 by approximately 90° or any other angle as desired.

In some embodiments, spline barrel 113 may be retained to tail stem protector 44 such that spline barrel 113 may rotate relative to tail stem protector 44. In some embodiments, valve position indicator 100 may include sleeve retainer 117 to retain spline barrel 113. In some embodiments, sleeve retainer 117 may be a plate having a diameter or width larger than the diameter of spline barrel 113. In some embodiments, sleeve retainer 117 may have retainer hole 119 positioned to allow retaining connector 121 to pass therethrough and secure sleeve retainer 117 to tail stem protector 44. Retaining connector 121 may be, for example and without limitation, a threaded fastener such as a bolt. In such embodiments, spline barrel 113 may be retained between sleeve retainer 117 and one or more components of outer housing 101, such as clamp 103, such that longitudinal movement of spline barrel 113 relative to tail stem protector 44 is constrained.

In some embodiments, valve position indicator 100 may include indicator flag 123. Indicator flag 123 may be mechanically coupled to spline barrel 113. In some embodiments, indicator flag 123 may extend radially from spline barrel 113. In some embodiments, indicator flag 123 may be coupled to spline barrel 113 by flag clamp 125. Flag clamp 125 may, in some embodiments, be a ring clamp secured to spline barrel 113 by tightening a threaded fastener, depicted as bolt 127. In some embodiments, flag clamp 125 may allow indicator flag 123 to be coupled to spline barrel 113 at any rotational orientation such that the alignment of indicator flag 123 relative to spline barrel 113 may be adjusted as further described below.

Figure 6:
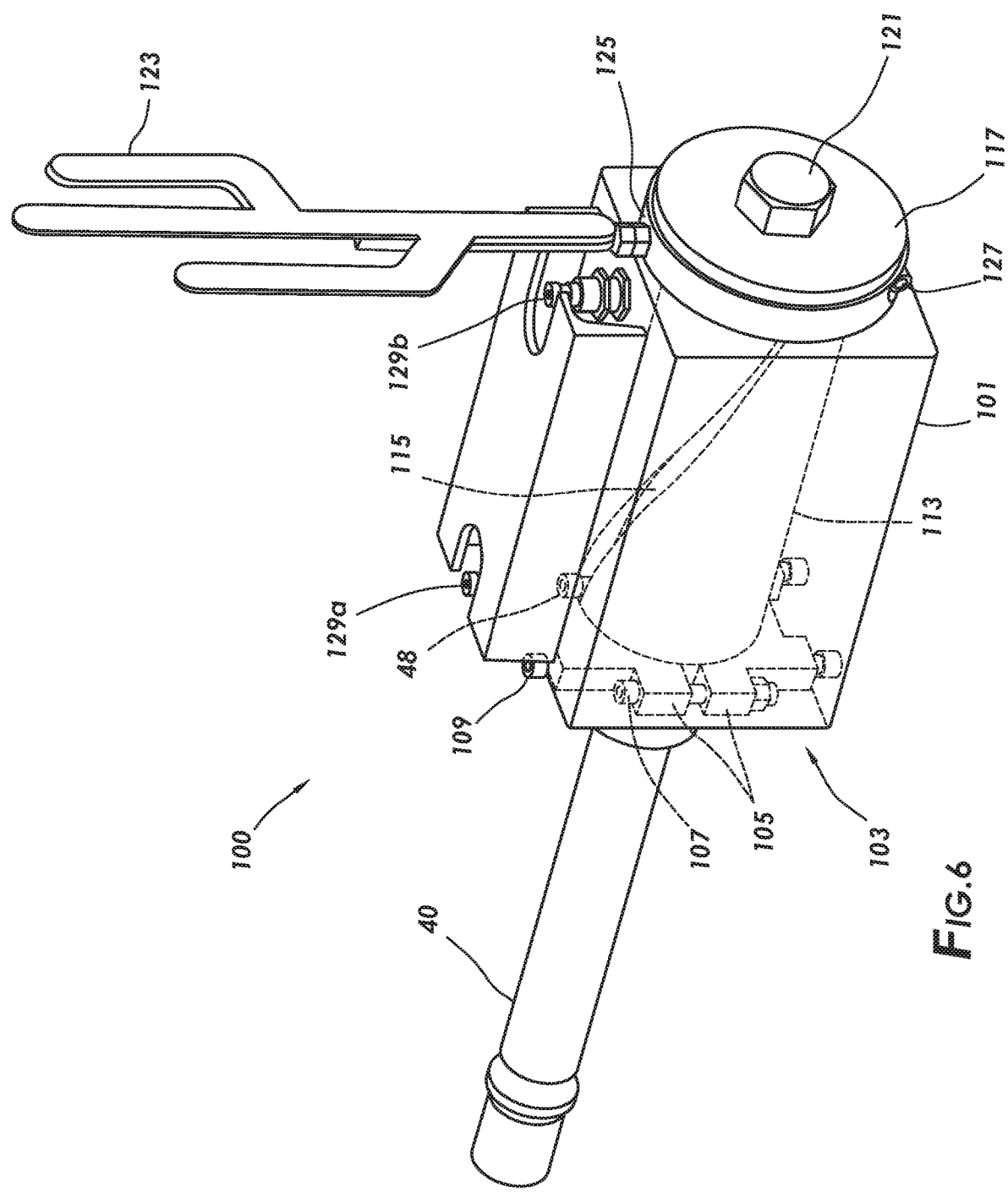
FIG. 6 depicts a partially transparent perspective view of the valve position indicator of FIG. 3 in a first position.
Figure 7:
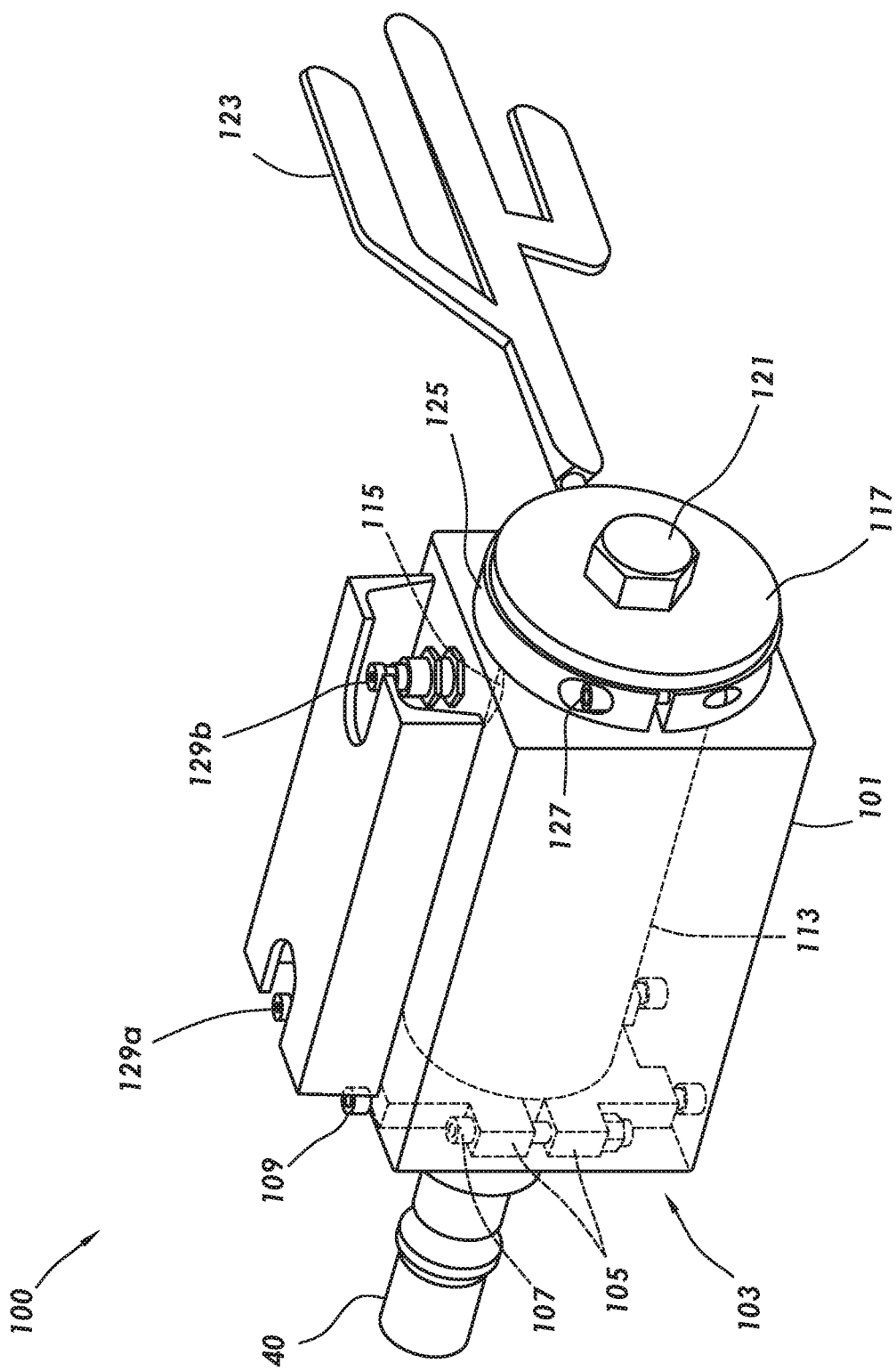
FIG. 7 depicts a partially transparent perspective view of the valve position indicator of FIG. 3 in a second position.

When valve position indicator 100 is assembled to valve 20, follower 48 may be positioned at least partially within or may extend through helical slot 115. As tail stem 40 moves between the extended and retracted position, follower 48 may traverse helical slot 115, causing spline barrel 113 to rotate relative to tail stem protector 44 commensurate with the pitch of helical slot 115. As spline barrel 113 rotates, indicator flag 123 may be moved in rotational orientation as indicator flag 123 is coupled to spline barrel 113. Indicator flag 123 may be defined as being in a first position when tail stem 40 is in the retracted position as shown in FIG. 6 and may be defined as being in a second position when tail stem 40 is in the extended position as shown in FIG. 7. The first and second positions of indicator flag 123 may be rotationally offset by the same rotational offset defined between the first end of helical slot 115 and the second end of helical slot 115.

In some embodiments, for example and without limitation, where the rotational offset is approximately 90°, indicator flag 123 may be positioned substantially vertically when in the first position and may be positioned substantially horizontally when in the second position. In other embodiments, indicator flag 123 may be positioned substantially horizontally when in the first position and may be positioned substantially vertically when in the second position. Such orientations may be selected by realigning indicator flag 123 relative to spline barrel 113 using flag clamp 125.

By preselecting the orientations of indicator flag 123 when in the first position and in the second position, the status of valve 20 may be readily identified by visual inspection of indicator flag 123. For example, where the retracted position of tail stem 40 corresponds to a state in which valve 20 is closed, the first position of indicator flag 123, as depicted in FIG. 6, may indicate to an observer that valve 20 is fully closed. Likewise, where the extended position of tail stem 40 corresponds to a state in which valve 20 is open, the second position of indicator flag 123, as depicted in FIG. 7, may indicate to an observer that valve 20 is fully open. If indicator flag 123 is in any position other than the first position or second position, indicator flag 123 may thereby indicate that valve 20 is not fully open or closed. Likewise, rotational movement of indicator flag 123 may indicate to an observer that valve 20 is being manipulated. The direction of movement of indicator flag 123 may indicate to the observer whether valve 20 is in the process of being opened or is in the process of being closed.

In some embodiments, indicator flag 123 may have a contrasting or otherwise highly visible color or shape to assist with the identification of the orientation of indicator flag 123. The specific shape of indicator flag 123 depicted herein is not intended to limit the scope of the present disclosure, and indicator flag 123 may be formed in any shape or configuration or may be colored or patterned in any way within the scope of this disclosure.

In some embodiments, valve position indicator 100 may include one or more sensors positioned to determine the position of tail stem 40, and thereby determine the status of valve 20. For example, in some embodiments, valve position indicator 100 may include one or more proximity sensors 129a, 129b. Proximity sensors 129a, 129b may be any sensor capable of detecting that follower 48 is in a position proximate proximity sensor 129a, 129b, and may be, for example and without limitation, one or more of a capacitive sensor, ultrasonic sensor, eddy current sensor, inductive sensor, magnetic sensor, reed switch, optical sensor, Hall effect sensor, or a physical sensor such as a limit switch. In some embodiments, proximity sensors 129a, 129b may be coupled to outer housing 101 such that proximity sensors 129a, 129b are positioned near to follower 48 when follower 48 is in a preselected position. For example and without limitation, in some embodiments, proximity sensor 129a may be positioned proximate to follower 48 when tail stem 40 is in the retracted position as depicted in FIG. 6. Proximity sensor 129a may provide a signal reflecting that follower 48 is proximate proximity sensor 129a, thereby indicating that tail stem 40 is in the retracted position and valve 20 is closed. Likewise, in some embodiments, proximity sensor 129b may be positioned proximate to follower 48 when tail stem 40 is in the extended position as depicted in FIG. 7. Proximity sensor 129b may provide a signal reflecting that follower 48 is proximate proximity sensor 129b, thereby indicating that tail stem 40 is in the extended position and valve 20 is open. In some embodiments, additional proximity sensors may be used to detect other desired positions of tail stem 40 relative to outer housing 101. In some embodiments, when neither of proximity sensors 129a, 129b detect follower 48, such a state may indicate that valve 20 is not fully open or fully closed.

Figure 8:
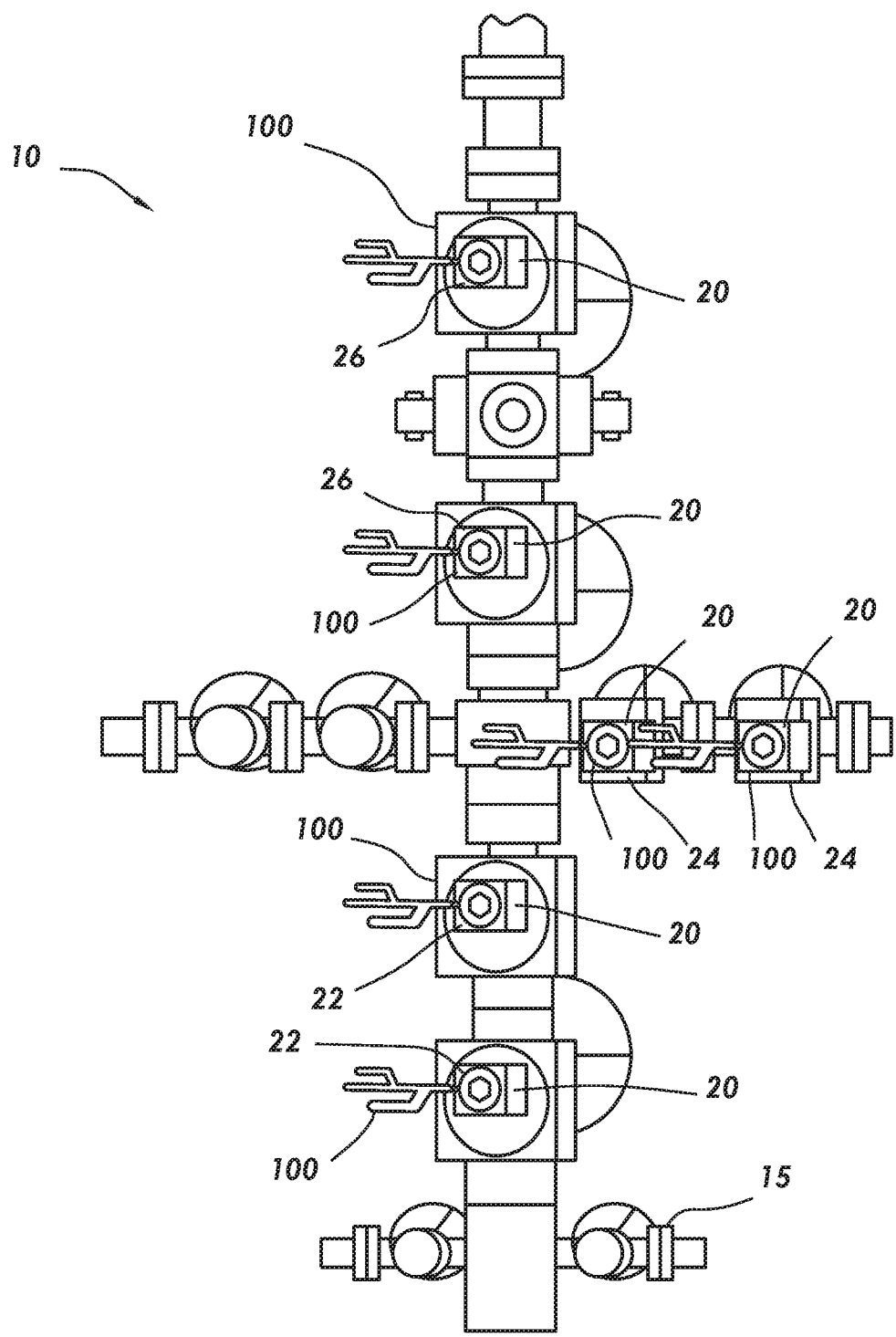
FIG. 8 depicts a valve tree having valve position indicators consistent with at least one embodiment of the present disclosure.
Figure 9:
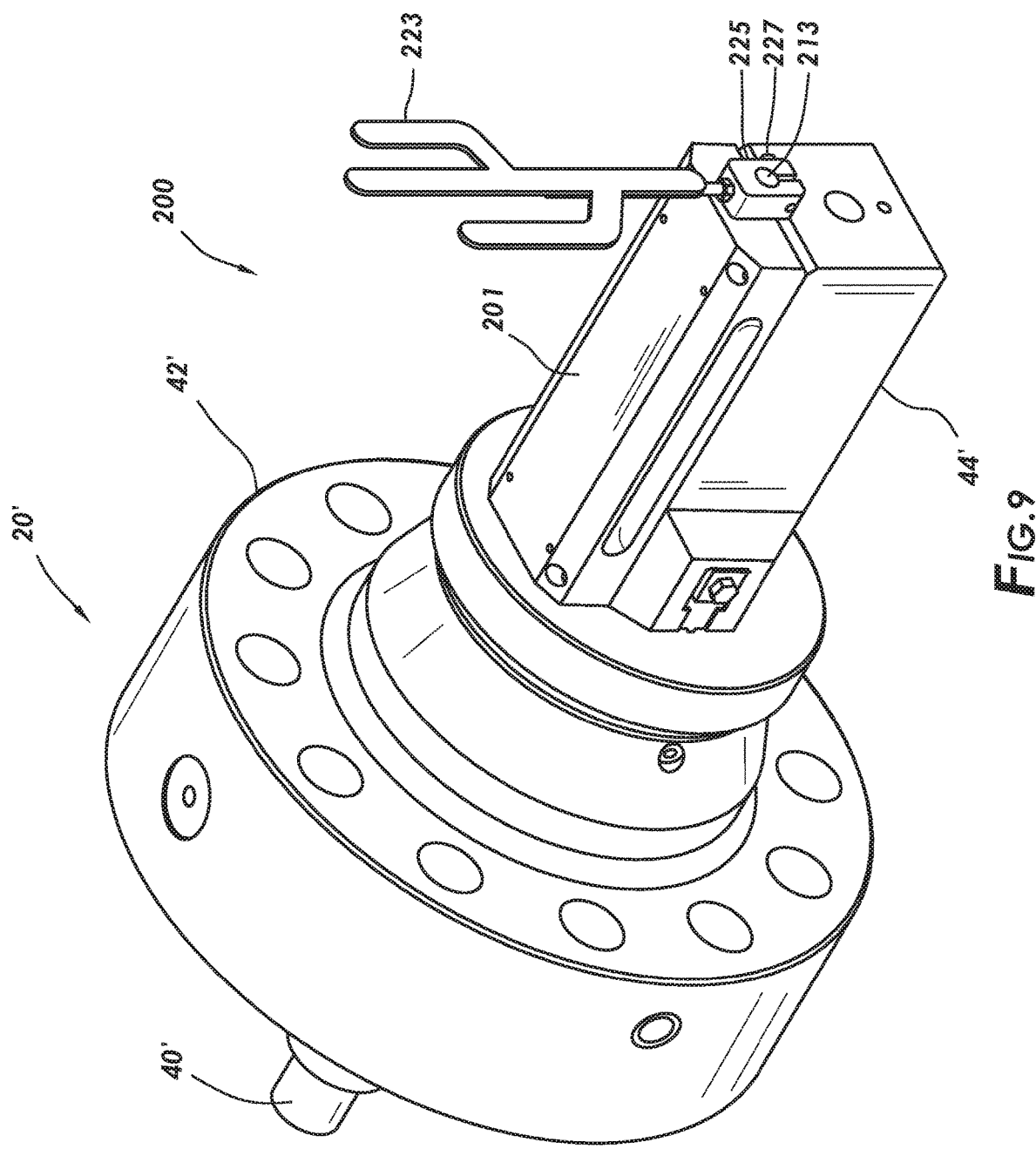
FIG. 9 depicts a perspective view of a valve position indicator consistent with at least one embodiment of the present disclosure.
Figure 10:
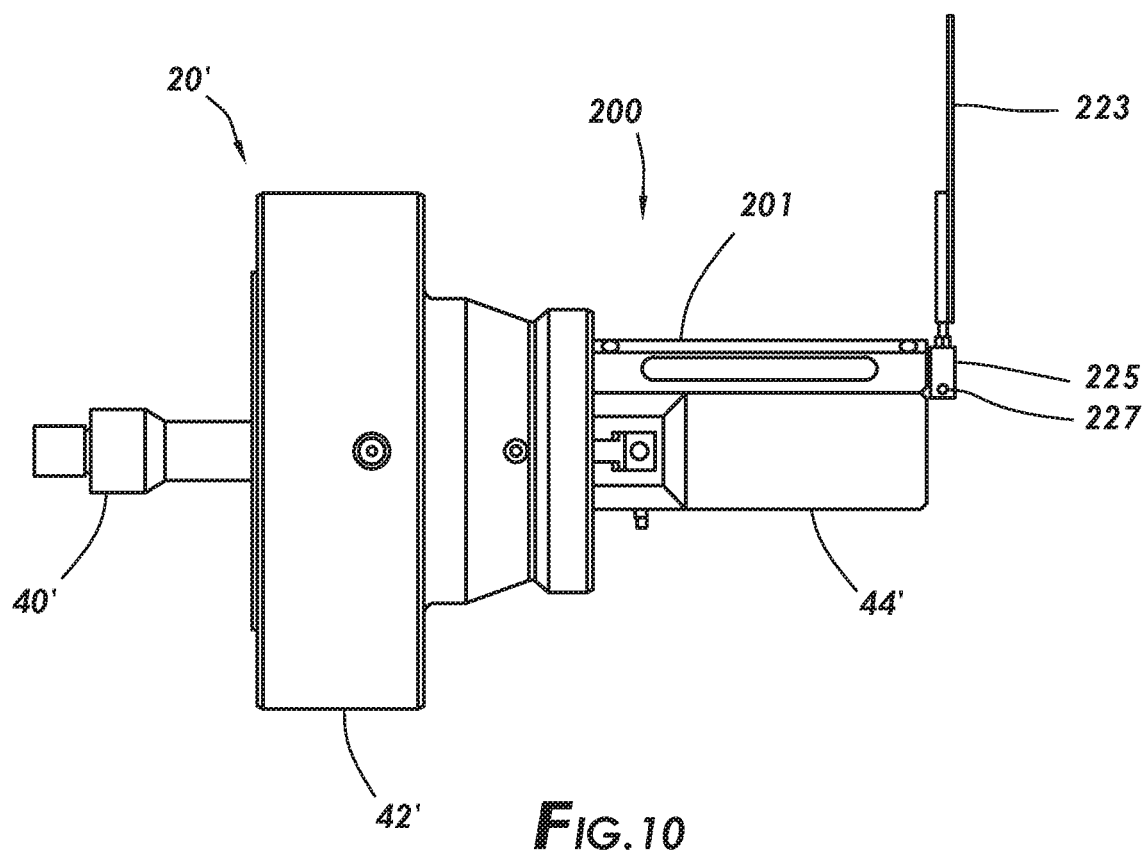
FIG. 10 depicts a side view of the valve position indicator of FIG. 9.
Figure 11:
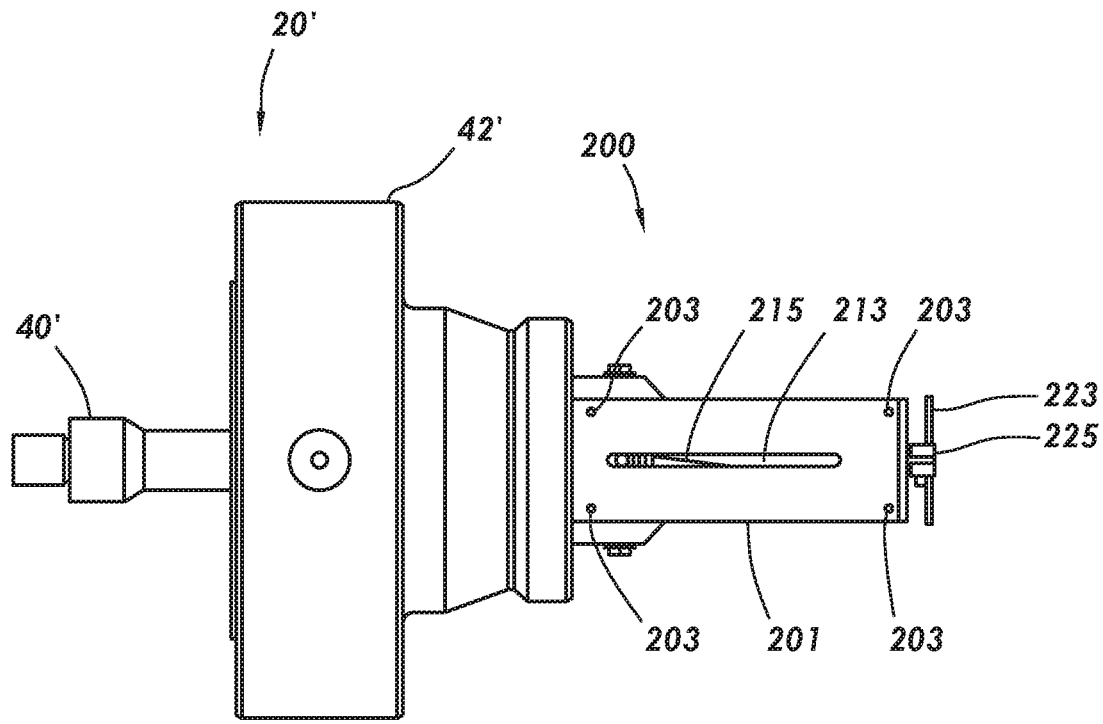
FIG. 11 depicts a top view of the valve position indicator of FIG. 9.
Figure 12:
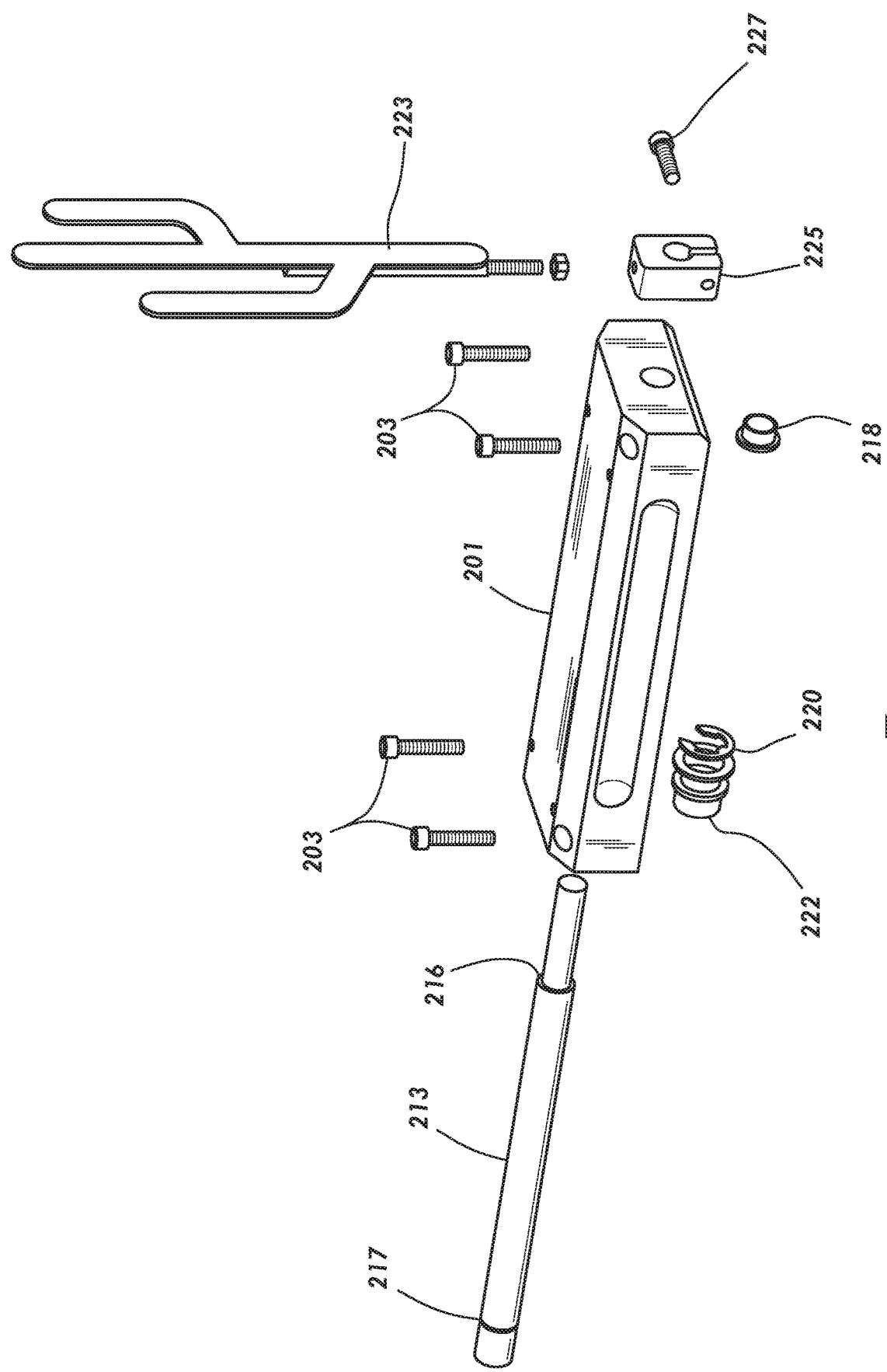
FIG. 12 depicts an exploded view of the valve position indicator of FIG. 9.

In some embodiments, valve 20 may be used as part of a flow control apparatus for a well such as valve tree 10 as depicted in FIG. 8. Valve tree 10 may be coupled to wellhead 15 and may include one or more valves 20 for controlling fluid connections including, for example and without limitation, master valves 22, wing valves 24, and swab valves 26. In some embodiments, one or more of valves 20 of valve tree 10 may include valve position indicator 100.

FIGS. 9-12, 14, and 15 depict valve position indicator 200 consistent with at least one embodiment of the present disclosure. Valve position indicator 200 may, for example and without limitation, visually indicate the status of valve 20' to which valve position indicator 200 is coupled, i.e. whether valve 20' is in an open position or a closed position; may visually indicate that valve 20' is in an intermediate position between fully open and fully closed; or may visually indicate that valve 20' is moving between the open and the closed positions, as further described below.

Valve position indicator 200 may be coupled to tail bonnet 42' as shown in FIGS. 9-12. In some embodiments, as described herein above with respect to valve 20, valve 20' may include tail stem 40', which may extend through tail bonnet 42' into valve position indicator 200. Tail stem 40' may move along the longitudinal axis as gate 34, described above, is repositioned. In some embodiments, when gate 34 is in the open position, tail stem 40' may extend from tail bonnet 42' a larger distance, defining an extended position of tail stem 40', than when gate 34 is in the closed position, defining a retracted position of tail stem 40'.

Figure 14:
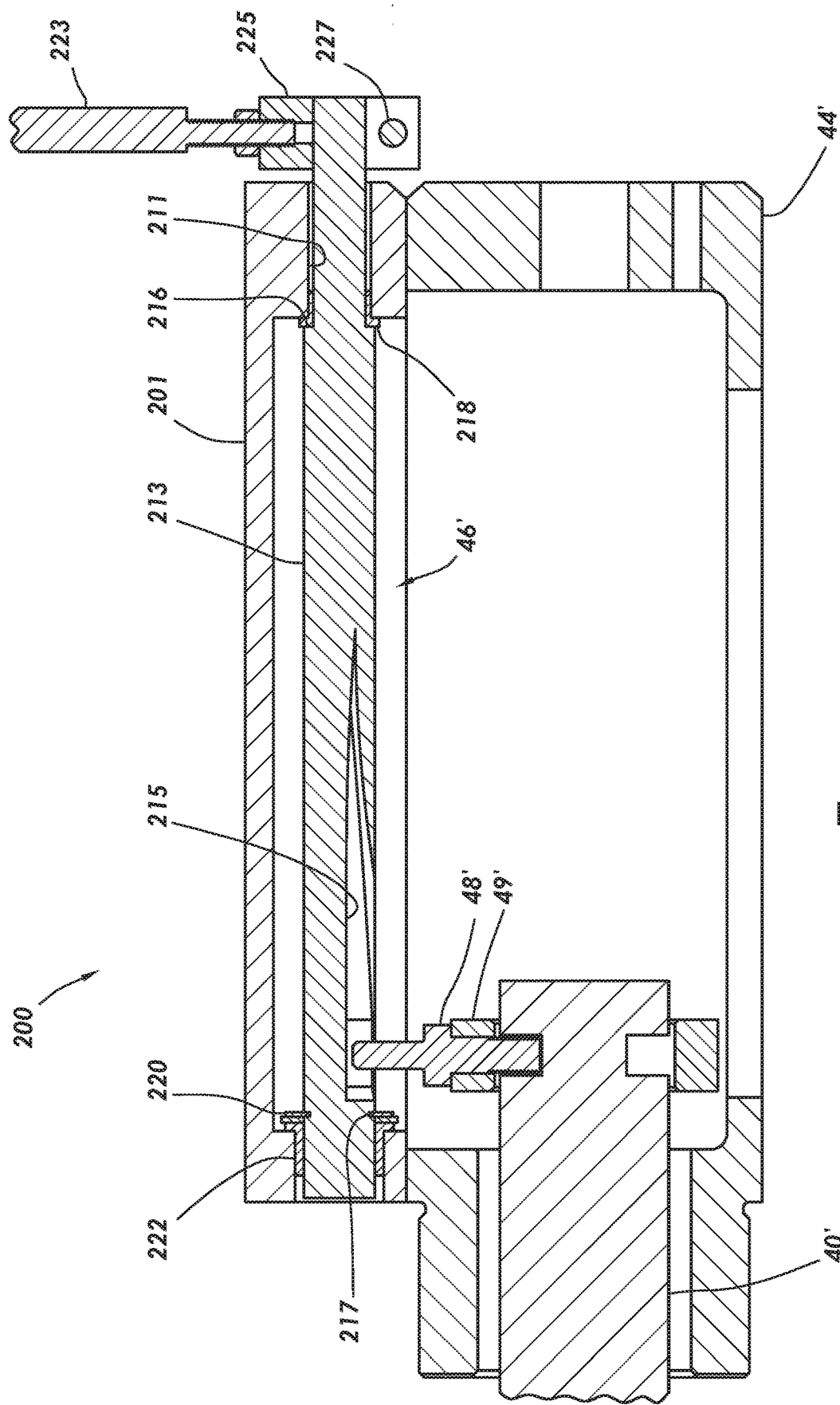
FIG. 14 depicts a cross-section of the valve position indicator of FIG. 9 in a first position.
Figure 15:
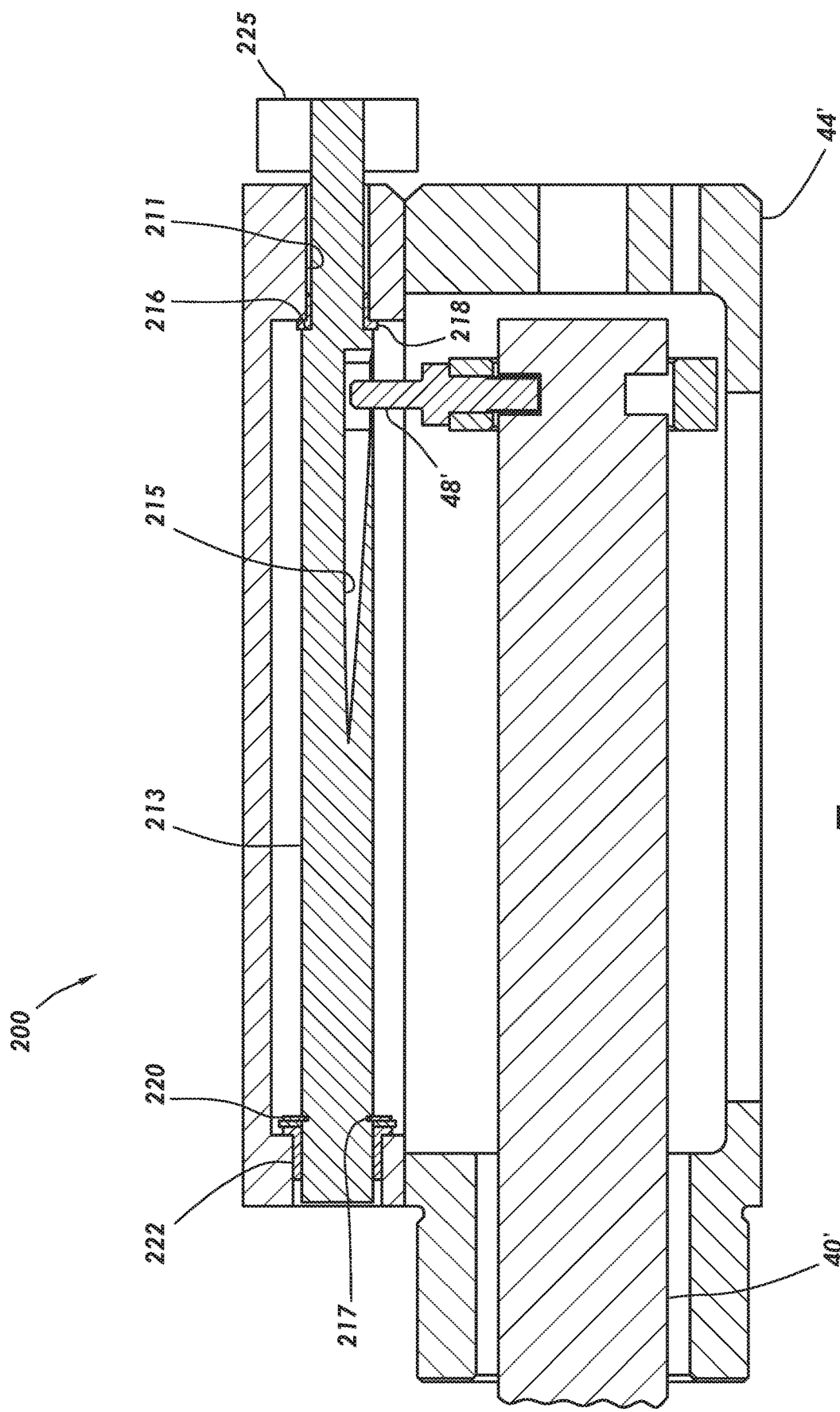
FIG. 15 depicts a cross-section of the valve position indicator of FIG. 9 in a second position.

With reference to FIGS. 9-12, 14, and 15, in some embodiments, tail stem 40' may be positioned within tail stem protector 44' to, for example and without limitation, avoid damage to tail stem 40' when tail stem 40' is extended from tail bonnet 42'. Tail stem 40' may be tubular and may be mechanically coupled to tail bonnet 42'. In some embodiments, tail stem protector 44' may include slot 46' extending longitudinally along tail stem protector 44'. In some embodiments, follower 48' may be coupled to tail stem 40'. Follower 48' may be a protrusion or other body coupled to tail stem 40' such that follower 48' extends in a direction perpendicular to the extent of tail stem 40'. Follower 48' may extend at least partially through slot 46' of tail stem protector 44'. In some embodiments, follower 48' may be a threaded fastener such as a bolt or shoulder bolt or may be a pin or any other fastener or body coupled to tail stem 40' that extends perpendicular to the extent of tail stem 40'. In some embodiments, such as shown in FIGS. 14 and 15, follower 48' may include follower clamp 49' used to couple follower 48' to tail stem 40'.

In some embodiments, valve position indicator 200 may mechanically couple to tail stem protector 44' of valve 20'. Valve position indicator 200 may include outer housing 201. Outer housing 201 may be an elongated tube or box-shaped body that, when installed to tail stem protector 44', may extend along a side of tail stem protector 44'. Outer housing 201 may mechanically couple to tail stem protector 44' by, for example and without limitation, one or more threaded fasteners 203. Outer housing 201 may couple to tail stem protector 44' such that valve position indicator 200 is aligned with slot 46'.

In some embodiments, outer housing 201 may include opening 211 at the end of outer housing 201 at the end of outer housing 201 distal to the body of valve 20'. In some embodiments, opening 211 may be positioned generally aligned with the end of tail stem protector 44'.

Figure 13:
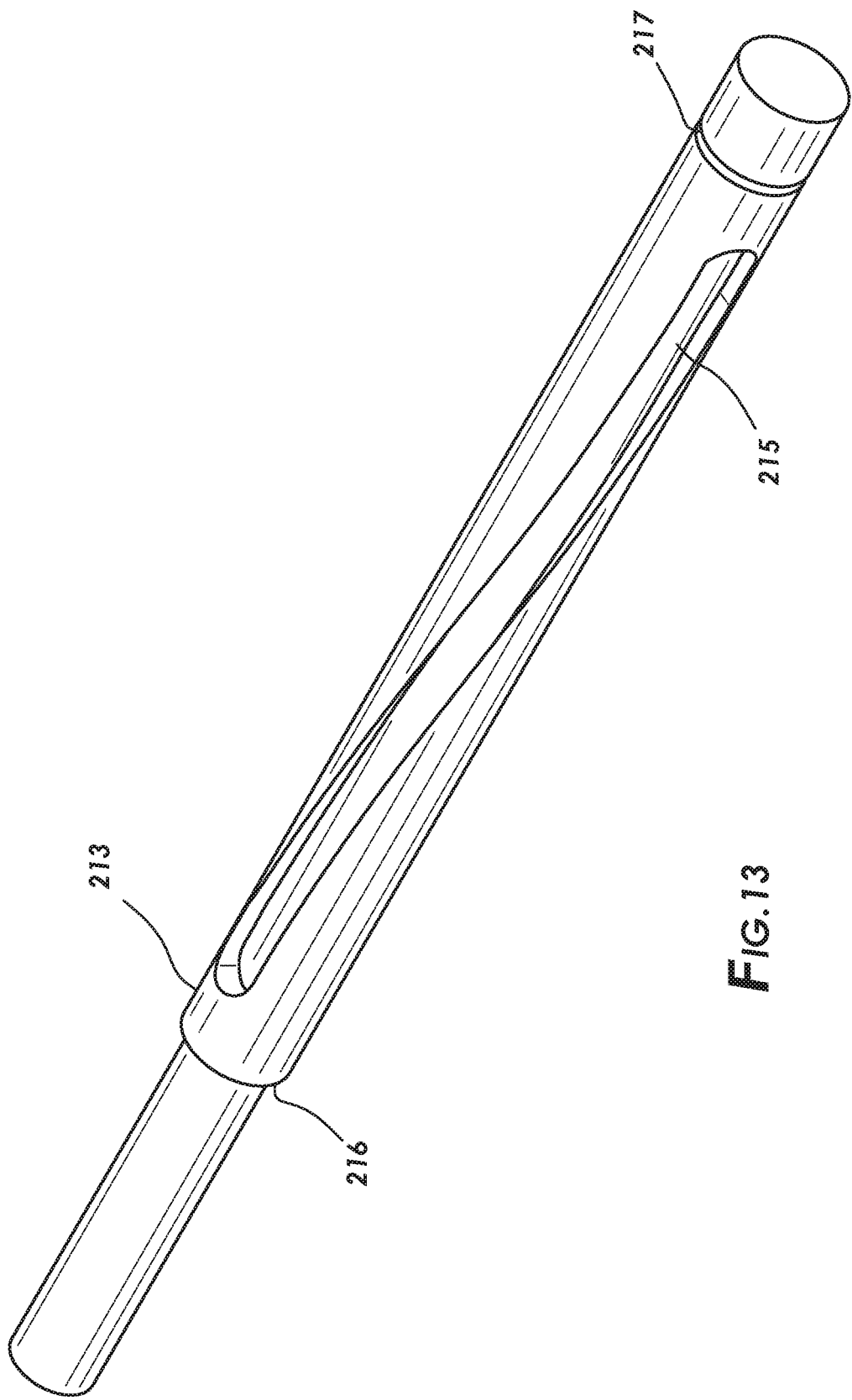
FIG. 13 depicts a perspective view of an indicator shaft of a valve position indicator consistent with at least one embodiment of the present disclosure.

In some embodiments, valve position indicator 200 may include actuation rod 213. Actuation rod 213 may be positioned within outer housing 201 outside of tail stem protector 44' parallel to and extending along slot 46'. Actuation rod 213 may extend at least partially through opening 211. Actuation rod 213, as shown in FIG. 13, may include helical slot 215. Helical slot 215 may extend from near the first end of actuation rod 213 to near the second end of actuation rod 213. Helical slot 215 may be formed to have a pitch such that the first end of helical slot 215 is offset by a selected angle from the second end of helical slot 215. In some such embodiments, for example and without limitation, the first end of helical slot 215 may be rotationally offset from the second end of helical slot 215 by approximately 90° or any other angle as desired.

In some embodiments, actuation rod 213 may include shoulder 216. Shoulder 216 may engage against outer housing 201 at opening 211 through which actuation rod 213 passes as shown in FIGS. 14, 15. Shoulder 216 may, for example and without limitation, retain actuation rod 213 within outer housing 201 by inhibiting actuation rod 213 from passing through opening 211 while allowing actuation rod 213 to rotate relative to outer housing 201. In some embodiments, bushing 218 may be positioned between actuation rod 213 and outer housing 201 at opening 211 to, for example and without limitation, reduce wear on actuation rod 213 and outer housing 201 during operation of valve position indicator 200.

In some embodiments, actuation rod 213 may include retention slot 217. Retention slot 217 may, in some embodiments, be used to receive fastener 220, which, in some embodiments may be a c-clip. Fastener 220 may retain actuation rod 213 to outer housing 201 such that actuation rod 213 may rotate relative to outer housing 201. Actuation rod 213 may therefore be constrained within outer housing 201 by shoulder 216 and fastener 220. In some embodiments, bushing 222 may be positioned between actuation rod 213 and outer housing 201 to, for example and without limitation, reduce wear on actuation rod 213 and outer housing 201 during operation of valve position indicator 200.

In some embodiments, valve position indicator 200 may include indicator flag 223. Indicator flag 223 may be mechanically coupled to actuation rod 213. In some embodiments, indicator flag 223 may extend radially from actuation rod 213. In some embodiments, indicator flag 223 may be coupled to actuation rod 213 by flag clamp 225. Flag clamp 225 may, in some embodiments, be a ring clamp secured to actuation rod 213 by tightening a threaded fastener, depicted as bolt 227. In some embodiments, flag clamp 225 may allow indicator flag 223 to be coupled to actuation rod 213 at any rotational orientation such that the alignment of indicator flag 223 relative to actuation rod 213 may be adjusted as further described below.

When valve position indicator 200 is assembled to valve 20', follower 48' may be positioned at least partially within helical slot 215. As tail stem 40' moves between the extended and retracted position, follower 48' may traverse helical slot 215, causing actuation rod 213 to rotate relative to tail stem protector 44' commensurate with the pitch of helical slot 215. As actuation rod 213 rotates, indicator flag 223 may be moved in rotational orientation as indicator flag 223 is coupled to actuation rod 213. Indicator flag 223 may be defined as being in a first position when tail stem 40' is in the retracted position as shown in FIG. 14 and may be defined as being in a second position when tail stem 40' is in the extended position as shown in FIG. 15. The first and second positions of indicator flag 223 may be rotationally offset by the same rotational offset defined between the first end of helical slot 215 and the second end of helical slot 215.

In some embodiments, for example and without limitation, where the rotational offset is approximately 90°, indicator flag 223 may be positioned substantially vertically when in the first position and may be positioned substantially horizontally when in the second position. In other embodiments, indicator flag 223 may be positioned substantially horizontally when in the first position and may be positioned substantially vertically when in the second position. Such orientations may be selected by realigning indicator flag 223 relative to actuation rod 213 using flag clamp 225.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A valve comprising:
   a valve housing, the valve housing having a central bore;
   a gate positioned within the valve housing;
   a tail stem, the tail stem coupled to the gate and extending from the valve housing;
   a tail stem protector, the tail stem protector coupled to and extending from the valve housing, the tail stem protector positioned about the tail stem, the tail stem protector having a slot formed therein and extending longitudinally along the tail stem protector; and
   a valve position indicator, the valve position indicator including:
      an outer housing, the outer housing coupled to the tail stem protector such that the slot of the tail stem protector is aligned with the outer housing, the outer housing including an opening;
      an actuation rod, the actuation rod positioned within the outer housing and extending at least partially through the opening in the outer housing, the actuation rod having a helical slot formed therein;
      an indicator flag, the indicator flag coupled to the actuation rod and extending radially therefrom; and
      a follower, the follower coupled to the tail stem, the follower extending in a direction perpendicular to the extent of the tail stem, the follower extending through the slot in the tail stem protector and into the helical slot of the actuation rod.

2. The valve of claim 1, wherein the indicator flag is coupled to the spline barrel by a flag clamp, the flag clamp being a ring clamp, the indicator flag adjustable in rotational orientation by the flag clamp.

3. The valve of claim 1, wherein the outer housing is coupled to the tail stem protector by one or more fasteners.

4. The valve of claim 1, wherein the follower is coupled to the tail stem by a follower clamp.

5. The valve of claim 1, wherein the helical slot of the actuation rod is formed to have a pitch such that a first end of the helical slot is offset by a selected angle from the second end of the helical slot such that the actuator rod is rotated between a first and second position as the tail stem is moved between the extended and retracted positions.

6. The valve of claim 5, wherein the selected angle is 90°.

7. The valve of claim 1, wherein the actuator rod further comprises a shoulder, the shoulder positioned to engage the inside of the outer housing at the opening.

8. The valve of claim 1, wherein the actuator rod further comprises a retention slot adapted to receive a fastener.

9. A valve position indicator for a valve, the valve position indicator comprising:
   an outer housing, the outer housing coupled to a tail stem protector such that a slot of the tail stem protector is aligned with the outer housing, the outer housing including an opening;
   an actuation rod, the actuation rod positioned within the outer housing and extending at least partially through the opening in the outer housing, the actuation rod having a helical slot formed therein;
   an indicator flag, the indicator flag coupled to the actuation rod and extending radially therefrom; and
   a follower, the follower coupled to the tail stem, the follower extending in a direction perpendicular to the extent of the tail stem, the follower extending through the slot in the tail stem protector and into the helical slot of the actuation rod.

10. The valve position indicator of claim 9, wherein the indicator flag is coupled to the actuation rod by a flag clamp, the flag clamp being a ring clamp, the indicator flag adjustable in rotational orientation by the flag clamp.

11. The valve position indicator of claim 9, wherein the outer housing is coupled to the tail stem protector by one or more fasteners.

12. The valve position indicator of claim 9, wherein the follower is coupled to the tail stem by a follower clamp.

13. The valve position indicator of claim 9, wherein the helical slot of the actuation rod is formed to have a pitch such that a first end of the helical slot is offset by a selected angle from the second end of the helical slot such that the actuator rod is rotated between a first and second position as the tail stem is moved between the extended and retracted positions.

14. The valve position indicator of claim 13, wherein the selected angle is 90°.

15. The valve position indicator of claim 9, wherein the actuator rod further comprises a shoulder, the shoulder positioned to engage the inside of the outer housing at the opening.

16. The valve position indicator of claim 9, wherein the actuator rod further comprises a retention slot adapted to receive a fastener.

* * * * *